(12) United States Patent
Anami

(10) Patent No.: US 12,033,167 B2
(45) Date of Patent: Jul. 9, 2024

(54) TRAFFIC FLOW DETERMINATION DEVICE, TRAFFIC FLOW DETERMINATION SYSTEM, TRAFFIC FLOW DETERMINATION METHOD, AND PROGRAM

(71) Applicant: NEC CORPORATION, Tokyo (JP)

(72) Inventor: Shinichi Anami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 943 days.

(21) Appl. No.: 15/999,623

(22) PCT Filed: Mar. 23, 2017

(86) PCT No.: PCT/JP2017/011602
§ 371 (c)(1),
(2) Date: Aug. 20, 2018

(87) PCT Pub. No.: WO2017/164272
PCT Pub. Date: Sep. 28, 2017

(65) Prior Publication Data
US 2021/0209615 A1    Jul. 8, 2021

(30) Foreign Application Priority Data
Mar. 23, 2016   (JP) .................. 2016-059142

(51) Int. Cl.
*G06Q 30/0201*   (2023.01)
(52) U.S. Cl.
CPC .............. *G06Q 30/0201* (2013.01)
(58) Field of Classification Search
None
See application file for complete search history.

(56) References Cited

U.S. PATENT DOCUMENTS

| | | | | |
|---|---|---|---|---|
| 7,957,565 B1* | 6/2011 | Sharma | ................. | G06V 20/53 382/103 |
| 8,009,863 B1* | 8/2011 | Sharma | ................. | G06Q 30/02 382/107 |
| 8,010,402 B1* | 8/2011 | Sharma | ................. | G06Q 99/00 705/7.29 |
| 9,355,530 B1* | 5/2016 | Block | ................. | G06Q 20/405 |
| 2002/0161651 A1* | 10/2002 | Godsey | ................. | G06Q 30/06 340/568.1 |
| 2003/0040815 A1* | 2/2003 | Pavlidis | ................. | G06V 10/24 700/83 |
| 2003/0132298 A1* | 7/2003 | Swartz | ............... | G06Q 20/3276 235/472.02 |

(Continued)

FOREIGN PATENT DOCUMENTS

| | | |
|---|---|---|
| JP | 8-242987 | 9/1996 |
| JP | 8-242987 A | 9/1996 |

(Continued)

OTHER PUBLICATIONS

International Search Report for PCT/JP2017/011602 dated, Jun. 20, 2017 (PCT/ISA/210).

(Continued)

*Primary Examiner* — Jamie H Austin
(74) *Attorney, Agent, or Firm* — Sughrue Mion, PLLC

(57) ABSTRACT

A traffic flow determination device includes: a traffic flow information acquisition unit that acquires a plurality of traffic flows; and a determination unit that determines that, among the plurality of traffic flows, a traffic flow at least part of which is included in a predetermined area is a traffic flow of a person belonging to a first category.

17 Claims, 12 Drawing Sheets

(56) References Cited

U.S. PATENT DOCUMENTS

| | | | | |
|---|---|---|---|---|
| 2006/0010027 A1* | 1/2006 | Redman | ............ | G06Q 30/02 |
| | | | | 705/7.29 |
| 2010/0185487 A1* | 7/2010 | Borger | ............ | G06Q 10/087 |
| | | | | 705/7.29 |
| 2011/0047005 A1* | 2/2011 | Scanlan | ............ | G07C 9/28 |
| | | | | 705/7.29 |
| 2013/0335572 A1* | 12/2013 | Fuhr | ............ | H04N 7/18 |
| | | | | 348/150 |
| 2014/0365334 A1* | 12/2014 | Hurewitz | ............ | G06Q 30/0613 |
| | | | | 705/26.41 |
| 2015/0235161 A1* | 8/2015 | Azar | ............ | G06Q 10/063114 |
| | | | | 705/7.15 |
| 2016/0117688 A1* | 4/2016 | Ghosh | ............ | H04W 4/021 |
| | | | | 705/7.29 |
| 2017/0330206 A1* | 11/2017 | Yada | ............ | G06Q 30/0201 |

FOREIGN PATENT DOCUMENTS

| | | | |
|---|---|---|---|
| JP | 2000-200357 A | 7/2000 | |
| JP | 3142791 U | 6/2008 | |
| JP | 2010-055594 A | 3/2010 | |
| JP | 2011-086045 A | 4/2011 | |
| JP | 2012-203479 A | 10/2012 | |
| JP | 2014232362 A | 12/2014 | |
| JP | 5679086 B1 | 3/2015 | |
| JP | 2015-133131 A | 7/2015 | |
| JP | 5811295 B1 | 11/2015 | |
| WO | 2015/140853 A1 | 9/2015 | |
| WO | WO-2016137169 A1 * | 9/2016 | ............ G06K 9/46 |

OTHER PUBLICATIONS

Communication dated Dec. 1, 2020, from the Japanese Patent Office in application No. 2016059142.

Japanese Office Action for JP Application No. 2016-059142 dated Jun. 15, 2021 with English Translation.

Japanese Office Action for JP Application No. 2021-146191 dated Nov. 29, 2022 with English Translation.

JP Office Communication for JP Application No. 2021-146191, dated May 23, 2023 with English Translation.

* cited by examiner

TRAFFIC FLOW DETERMINATION DEVICE, TRAFFIC FLOW DETERMINATION SYSTEM, TRAFFIC FLOW DETERMINATION METHOD, AND PROGRAM

CROSS REFERENCE TO RELATED APPLICATIONS

This application is a National Stage of International Application No. PCT/JP2017/011602 filed Mar. 23, 2017, claiming priority based on Japanese Patent Application No. 2016-059142, filed Mar. 23, 2016, the disclosure of which is incorporated herein in its entirety.

TECHNICAL FIELD

The present invention relates to a traffic flow determination device, a traffic flow determination system, a traffic flow determination method, and a program.

BACKGROUND ART

There are cases where analysis of the traffic flow of customers is carried out in order to promote sales and improve customer satisfaction.

Patent Document 1 describes as a related art, a technique of extracting the trajectory of a customer's movement, and adding attribute information such as the gender and age of a customer extracted from an image, to information indicating the trajectory.

PRIOR ART DOCUMENT

Patent Document

[Patent Document 1] Japanese Unexamined Patent Application, First Publication No. 08-242987

SUMMARY OF THE INVENTION

Problem to be Solved by the Invention

When analyzing the traffic flows of customers in supermarkets, convenience stores, and the like which do not have authentication devices such as terminals, there is a possibility that the accuracy of the analysis of traffic flow of customers may deteriorate due to intermingling of clerks at work and the customers.

For this reason, there has been a demand for technology capable of highly accurately analyzing the traffic flow of customers in a region without forcing the customers to perform a special act.

An exemplary object of the present invention is to provide a traffic flow determination device, a traffic flow determination system, a traffic flow determination method, and a program, capable of solving the above problems.

Means for Solving the Problem

A traffic flow determination device according to a first exemplary aspect of the present invention includes: a traffic flow information acquisition unit that acquires a plurality of traffic flows; and a determination unit that determines that, among the plurality of traffic flows, a traffic flow at least part of which is included in a predetermined area is a traffic flow of a person belonging to a first category.

A traffic flow determination method according to a second exemplary aspect of the present invention includes: acquiring a plurality of traffic flows; and determining that, among the plurality of traffic flows, a traffic flow at least part of which is included in a predetermined area is a traffic flow of a person belonging to a first category.

A program according to a third exemplary aspect of the present invention causes a computer to execute: acquiring a plurality of traffic flows; and determining that, among the plurality of traffic flows, a traffic flow at least part of which is included in a predetermined area is a traffic flow of a person belonging to a first category.

A traffic flow determination system according to a fourth exemplary aspect of the present invention includes: an imaging unit that acquires an image by performing imaging; a traffic flow generating unit that generates a plurality of traffic flows based on the image; and a determination unit that determines that, among the plurality of generated traffic flows, a traffic flow at least a part of which is included in a predetermined area is a traffic flow of a person belonging to a first category.

Effect of the Invention

According to an exemplary embodiment of the present invention, it is possible to analyze the traffic flow of a customer in an area with high accuracy without forcing the customer to perform a special act.

EMBODIMENTS FOR CARRYING OUT THE INVENTION

First Exemplary Embodiment

Hereinafter, exemplary embodiments will be described in detail with reference to the drawings.

A configuration of a traffic flow determination system 1 according to a first exemplary embodiment of the present invention will be described.

Figure 1:
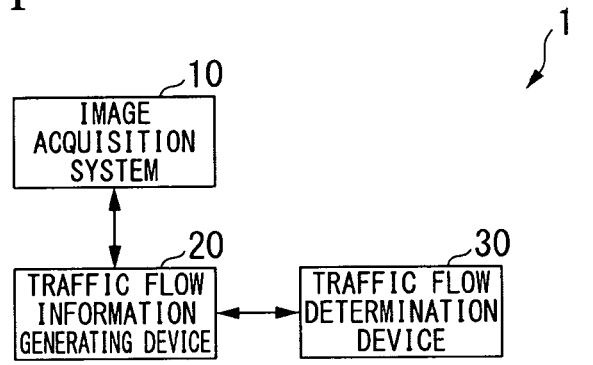
FIG. 1 is a diagram showing a configuration of a traffic flow determination system according to a first exemplary embodiment of the present invention.

As shown in FIG. 1, the traffic flow determination system 1 according to the first exemplary embodiment of the present invention includes an image acquisition system 10, a traffic flow information generating device 20, and a traffic flow determination device 30.

Figure 2:
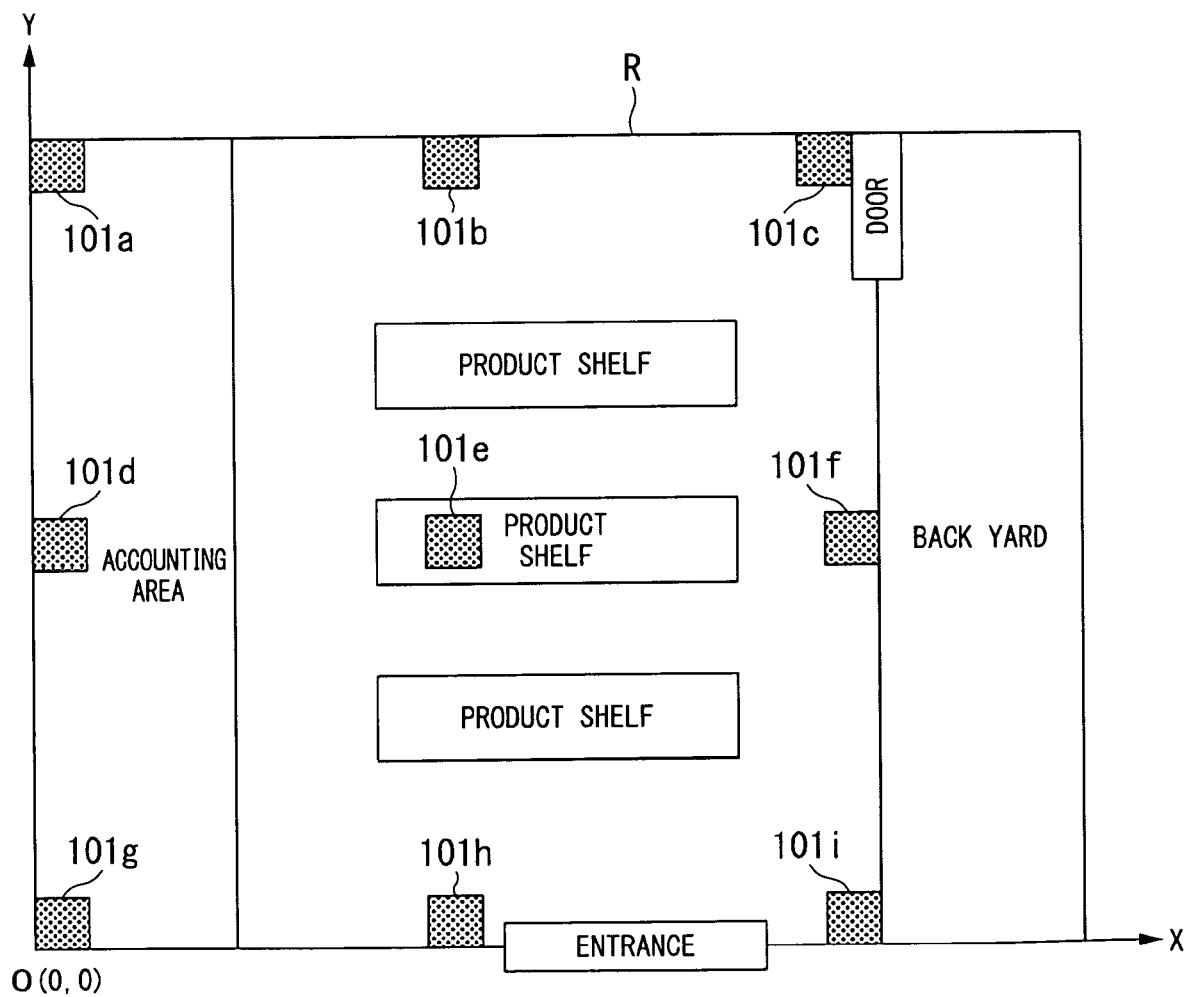
FIG. 2 is a diagram showing a configuration of an image acquisition system according to the first exemplary embodiment of the present invention.

As shown in FIG. 2, the image acquisition system 10 includes image acquisition units (imaging units) 101a, 101b, 101c, 101d, 101e, 101f, 101g, 101h, and 101i. The image acquisition units 101a to 101i may be video cameras.

The image acquisition units 101a to 101i are collectively referred to as image acquisition units 101.

Each of the image acquisition units 101 is provided on a side wall, a ceiling, or the like in a space R (area) of a supermarket or a convenience store (shop) of the like.

Each of the image acquisition units 101 acquires images in the space R by photographing within the space R. In other words, each of the image acquisition units 101 acquires an image including a moving object, by photographing moving objects in the space R.

Figure 3:
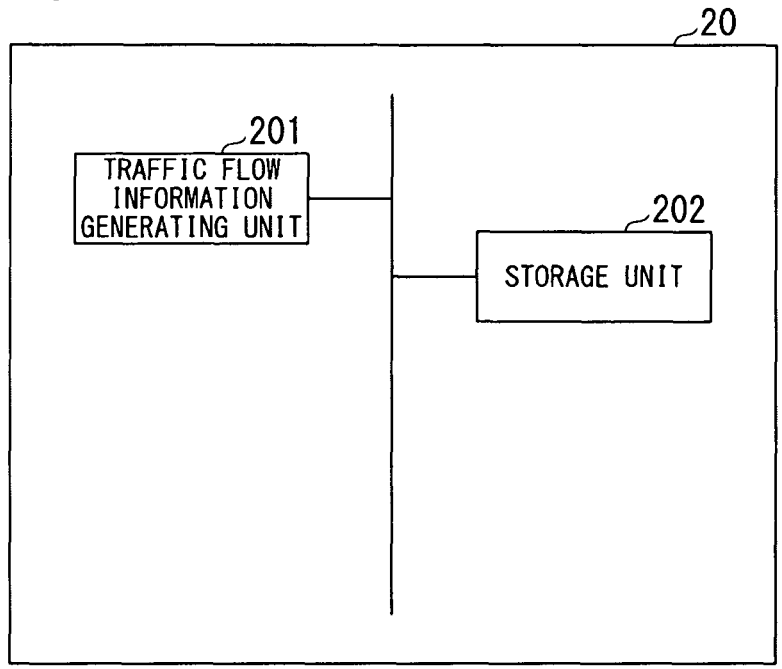
FIG. 3 is a diagram showing a configuration of a traffic flow information generating device according to the first exemplary embodiment of the present invention.

As shown in FIG. 3, the traffic flow information generating device 20 includes a traffic flow information generating unit 201 (traffic flow generating unit) and a storage unit 202.

The traffic flow information generating unit 201 acquires images captured by the respective image acquisition units 101.

For example, the traffic flow information generating unit 201 generates traffic flow information of each moving object, by using a technique described in the above-mentioned patent document 1 for the acquired image. The traffic flow information is information indicating a traffic flow of a moving object, that is, information indicating a line that indicates a route (locus) along which the moving object has moved (passed).

The storage unit 202 stores various pieces of information necessary for processing performed by the traffic flow information generating device 20.

Figure 4:
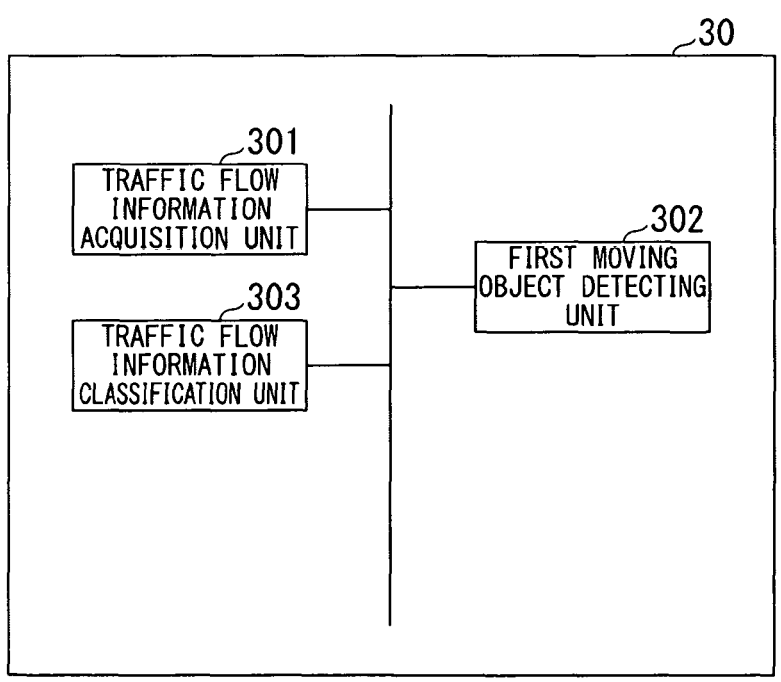
FIG. 4 is a diagram showing a configuration of a traffic flow determination device according to the first exemplary embodiment of the present invention.

As shown in FIG. 4, the traffic flow determination device 30 includes a traffic flow information acquisition unit 301, a first moving object detecting unit (determination unit) 302, and a traffic flow information classification unit 303.

The traffic flow information acquisition unit 301 acquires traffic flow information of each moving object moving in the space R.

Specifically, the traffic flow information acquisition unit 301 acquires from the traffic flow information generating device 20, traffic flow information generated by the traffic flow information generating unit 201.

The first moving object detecting unit 302 detects traffic flow information of an employee (first moving object) belonging to a first category.

Specifically, the first moving object detecting unit 302 identifies from among a plurality of pieces of traffic flow information acquired by the traffic flow information acquisition unit 301, traffic flow information that passes through one or a plurality of predetermined positions, within a range of error of determination. The predetermined position here is a position such as a register or a back yard through which only employees pass. The first moving object detecting unit 302 determines the identified traffic flow information as traffic flow information of an employee belonging to the first category.

The traffic flow information classification unit 303 determines that among the moving objects belonging to employees (first moving object) belonging to the first category and customers (second moving objects) not belonging to the first category, the traffic flow information not including traffic flow information for employees is traffic flow information of the customer. That is, the plurality of traffic flow information acquired by the traffic flow information acquisition unit 301 is made up of traffic flow information related to a plurality of moving objects. Each of the plurality of moving objects belongs to one of the first moving object and the second moving object. The traffic flow information classification unit 303 determines that traffic flow information excluding traffic flow information related to a moving object belonging to the first category among the plurality of traffic flow information is traffic flow information related to a moving object belonging to the second category.

For example, the traffic flow information classification unit 303 determines that, among the plurality of pieces of traffic flow information acquired by the traffic flow information acquisition unit 301, the traffic flow information excluding the traffic flow information determined as the traffic flow information of the employee by the first moving object detecting unit 302, is the traffic flow information of the customer.

Next, the processing of the traffic flow determination system 1 according to the first exemplary embodiment of the present invention will be described.

Figure 5:
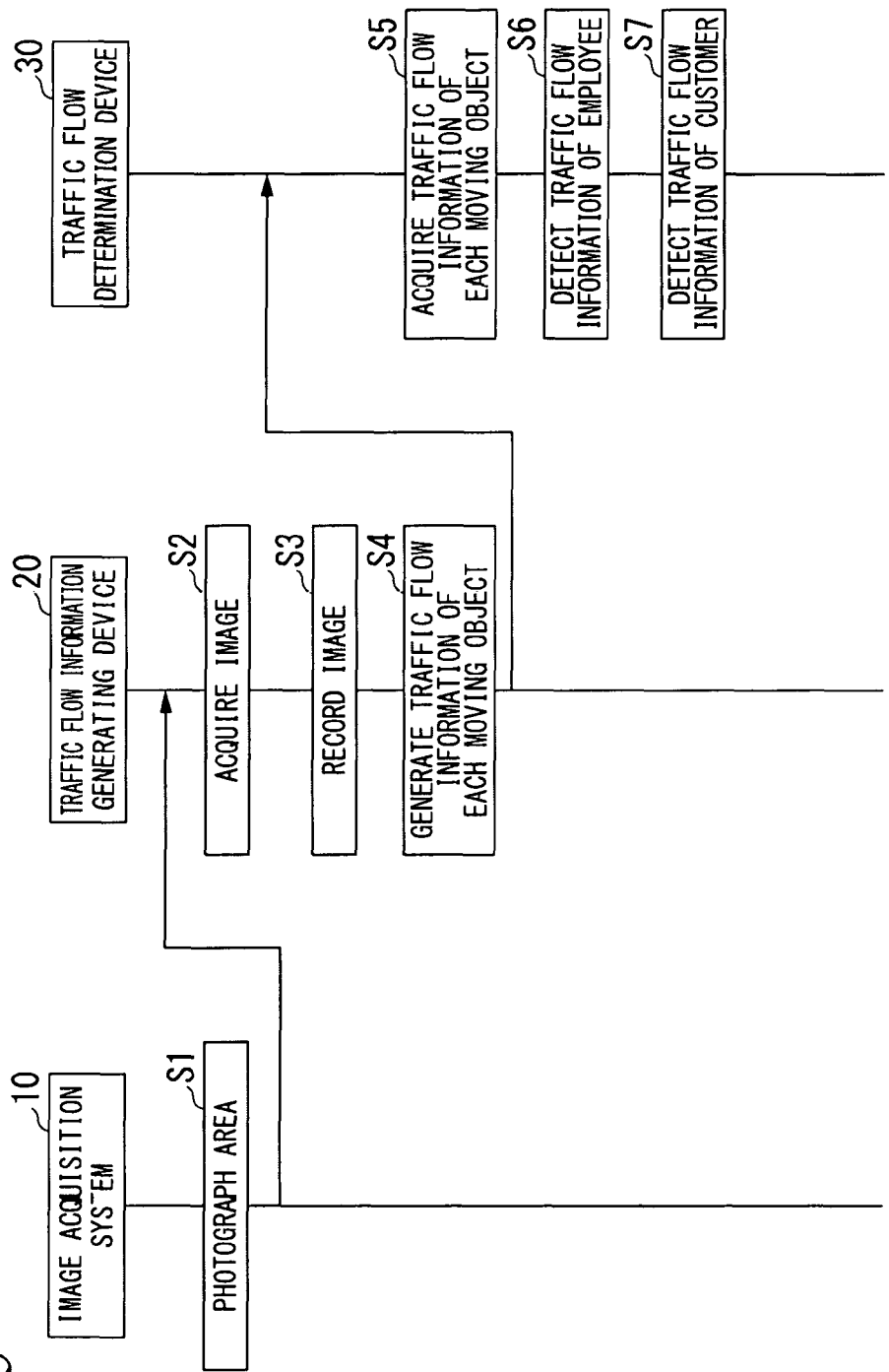
FIG. 5 is a diagram showing a processing flow of a traffic flow determination system according to the first exemplary embodiment of the present invention.

The processing flow of the traffic flow determination system 1 according to the first exemplary embodiment of the present invention shown in FIG. 5 will be described.

It is assumed that the traffic flow determination system 1 has the configuration shown in FIG. 1. It is assumed that the image acquisition system 10 has the configuration shown in FIG. 2. It is assumed that the traffic flow information generating device 20 has the configuration shown in FIG. 3. It is assumed that the traffic flow determination device 30 has the configuration shown in FIG. 4.

Each of the image acquisition units 101 acquires images in a space R of a supermarket or a convenience store, or the like, by photographing the space R (step S1).

The traffic flow information generating unit 201 acquires the images acquired from each of the image acquisition units 101 (step S2). The traffic flow information generating unit 201 writes the acquired image in the storage unit 202 (step S3).

For example, the traffic flow information generating unit 201 generates traffic flow information of each moving object by using the technique described in the above-described patent document 1 for the acquired image (step S4).

The traffic flow information acquisition unit 301 acquires traffic flow information of each moving object moving in the space R (step S5).

Specifically, the traffic flow information acquisition unit 301 acquires from the traffic flow information generating device 20, traffic flow information generated by the traffic flow information generating unit 201

The traffic flow information acquisition unit 301 transmits acquired traffic flow information of each of the moving objects, to the first moving object detecting unit 302 and the traffic flow information classification unit 303.

The first moving object detecting unit 302 and the traffic flow information classification unit 303 receive traffic flow information of each moving object from the traffic flow information acquisition unit 301.

The first moving object detecting unit 302 detects traffic flow information of an employee (first moving object) belonging to the first category (step S6).

Specifically, the first moving object detecting unit 302 identifies from among a plurality of pieces of traffic flow information received from the traffic flow information acquisition unit 301, traffic flow information including traffic flow that passes through one or a plurality of predetermined positions, within a range of error of determination. The first moving object detecting unit 302 determines the identified traffic flow information as traffic flow information of an employee belonging to the first category.

The first moving object detecting unit 302 transmits the determined traffic flow information of the employee, to the traffic flow information classification unit 303.

The traffic flow information classification unit 303 receives traffic flow information of employees from the first moving object detecting unit 302.

The traffic flow information classification unit 303 determines that among moving objects belonging to employees (first moving object) belonging to the first category and customers (second moving objects) not belonging to the first category, the traffic flow information not including traffic flow information for employees is traffic flow information of the customer (step S7).

For example, the traffic flow information classification unit 303 determines that, among the plurality of pieces of traffic flow information acquired by the traffic flow information acquisition unit 301, the traffic flow information excluding the traffic flow information determined as the traffic flow information of the employee by the first moving object detecting unit 302, is traffic flow information of the customer.

The processing flow of the traffic flow determination system 1 according to the first exemplary embodiment of the present invention has been described above. The traffic flow determination system 1 according to the above-described first exemplary embodiment of the present invention includes the image acquisition system 10, the traffic flow information generating device 20, and the traffic flow determination device 30. The image acquisition system 10 includes image acquisition units 101a to 101i. Each of the image acquisition units 101 is provided on a side wall, a ceiling, or the like, in a space R of a supermarket or a convenience store, or the like. Each of the image acquisition units 101 photographs the space R, and acquires an image in the space R. The traffic flow information generating device 20 includes a traffic flow information generating unit 201, and a storage unit 202. The traffic flow information generating unit 201 acquires the images acquired by each of the image acquisition units 101. The storage unit 202 stores various pieces of information necessary for processing performed by the traffic flow information generating device 20. The traffic flow determination device 30 includes a traffic flow information acquisition unit 301, a first moving object detecting unit 302, and a traffic flow information classification unit 303. The traffic flow information acquisition unit 301 acquires traffic flow information of each moving object moving in the space R. The first moving object detecting unit 302 detects traffic flow information of an employee (first moving object) belonging to the first category. The traffic flow information classification unit 303 determines that among moving objects belonging to employees (first moving object) belonging to the first category and customers (second moving objects) not belonging to the first category, the traffic flow information not including traffic flow information for employees is traffic flow information of the customer.

In this way, the traffic flow determination system 1 can distinguish the traffic flow information of the customer in the area from the traffic flow information of the employee, and can identify only the traffic flow information of the customer. As a result, the traffic flow determination system 1 can analyze the traffic flow of the customer in the area with a high accuracy without forcing the customer to perform a special act.

Second Exemplary Embodiment

The configuration of the traffic flow determination system 1 according to a second exemplary embodiment of the present invention will be described.

Figure 6:
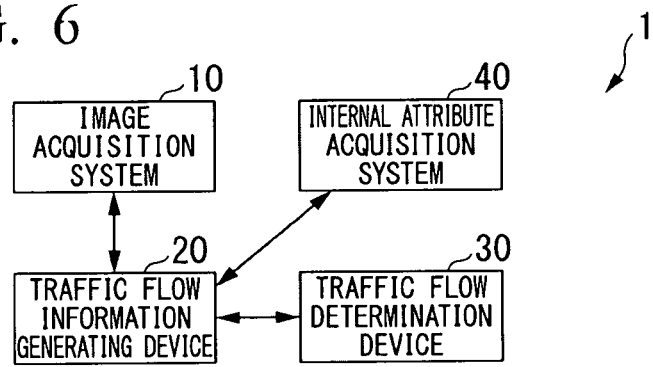
FIG. 6 is a diagram showing a configuration of a traffic flow determination system according to a second exemplary embodiment of the present invention.

As shown in FIG. 6, the traffic flow determination system 1 according to the second exemplary embodiment of the present invention includes an image acquisition system 10, a traffic flow information generating device 20, a traffic flow determination device 30, and an internal attribute acquisition system 40.

The internal attribute acquisition system 40 manages attribute information. The attribute information is information stored in association with each customer. The attribute information may be, for example, information indicating the age and gender estimated using a program for estimating age and gender from an image including a face. The attribute information may be personal information including an individual name obtained from registration information at the time of registration of face images, point cards, and the like. The attribute information may be information indicating a hobby preference estimated from purchase history. The attribute information may be information indicating affiliation information or the like obtained from object recognition of uniforms or belongings, or the like.

The internal attribute acquisition system 40 is a system provided by its own company.

Figure 7:
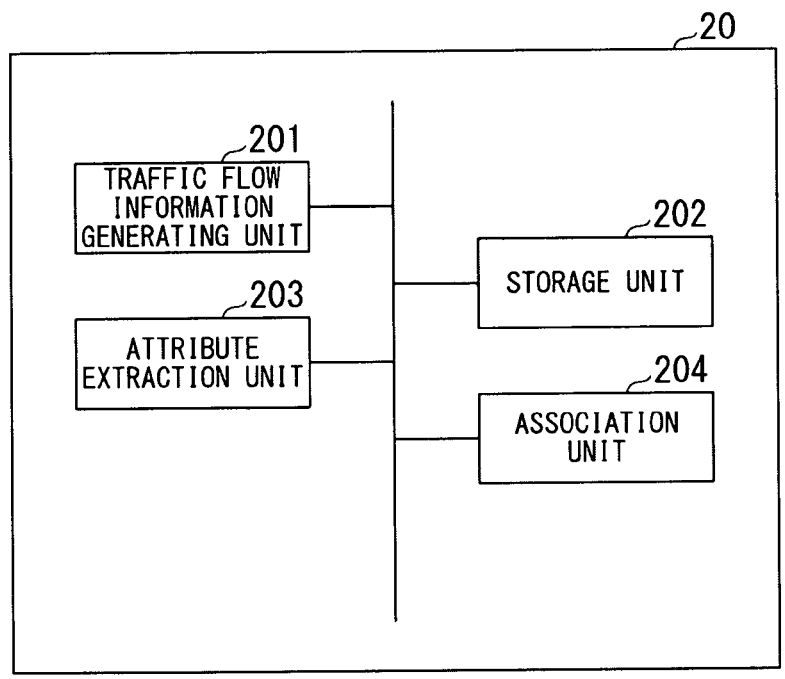
FIG. 7 is a diagram showing a configuration of a traffic flow information generating device according to the second exemplary embodiment of the present invention.

As shown in FIG. 7, the traffic flow information generating device 20 includes a traffic flow information generating unit 201, a storage unit 202, an attribute extraction unit 203, and an association unit 204.

The attribute extraction unit 203 acquires an image corresponding to customer traffic flow information determined by the traffic flow information classification unit 303.

Based on the acquired image corresponding to the customer traffic flow information, the attribute extraction unit 203 extracts the attribute information closest to the customer from among the attribute information managed by the internal attribute acquisition system 40 (attribute information having the greatest relevance to the customer).

For example, when a customer has registered the image of their face in the past, the attribute extraction unit 203 uses the face included in the image corresponding to the customer traffic flow information, to identify the face of the customer from among the attribute information managed by the internal attribute acquisition system 40. The attribute extraction unit 203 extracts attribute information associated with the identified face of the customer.

For example, in the case where the customer has not registered the image of their face, the following process may be performed. That is, the attribute extraction unit 203 uses a program for estimating age and gender to identify the age and gender of the customer. Further, the attribute extraction unit 203 identifies information indicating personal information including personal names obtained from registration information at the time of registration of face images, point cards, and the like, hobby preferences estimated from purchase history, and affiliation information and the like obtained from object recognition of uniforms or belongings, or the like. Then, the attribute extraction unit 203 extracts from among the attribute information managed by the internal attribute acquisition system 40, affiliation information closest to the personal information including the specified age, gender, and individual name, hobby preference estimated from the purchase history, the affiliation information, and so forth.

The association unit 204 associates the customer traffic flow information with the attribute information extracted by the corresponding attribute extraction unit 203.

Next, the processing of the traffic flow determination system 1 according to the second exemplary embodiment of the present invention will be described.

Figure 8:
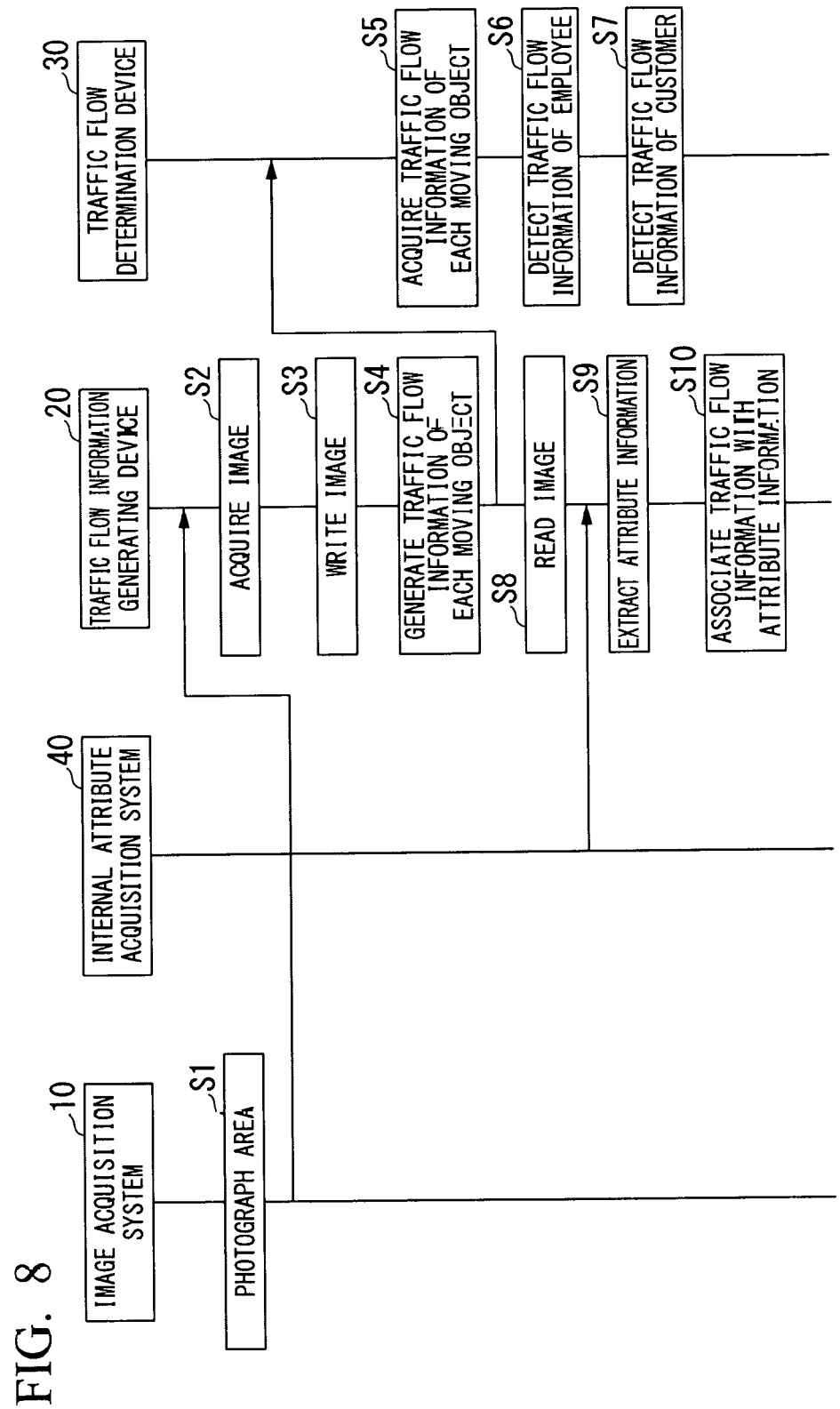
FIG. 8 is a diagram showing a processing flow of the traffic flow determination system according to the second exemplary embodiment of the present invention.

Here, the processing flow of the traffic flow determination system 1 according to the second exemplary embodiment of the present invention shown in FIG. 8 will be described.

The traffic flow determination system 1 performs the processing of step S1 to step S7.

The attribute extraction unit 203 reads the image corresponding to the customer traffic flow information determined by the traffic flow information classification unit 303, from the storage unit 202 (step S8).

Based on the acquired image corresponding to the customer traffic flow information, the attribute extraction unit 203 extracts the attribute information closest to the customer from among the attribute information managed by the internal attribute acquisition system 40 (attribute information having the greatest relevance to the customer) (step S9).

For example, when a customer has registered the image of their face in the past, the attribute extraction unit 203 uses the face in the image corresponding to the customer traffic flow information, to identify the face of the customer from among the attribute information managed by the internal attribute acquisition system 40. The attribute extraction unit 203 extracts attribute information associated with the identified face of the customer.

Moreover, for example, in the case where the customer has not registered the image of their face, the attribute extraction unit 203 uses a program for estimating age and gender to identify the age and gender of the customer. Further, the attribute extraction unit 203 identifies information indicating personal information including personal names obtained from registration information at the time of registration of face images, point cards, and the like, hobby preferences estimated from purchase history, and affiliation information and the like obtained from object recognition of uniforms or belongings, or the like. Then, the attribute extraction unit 203 may extract from among the attribute information managed by the internal attribute acquisition system 40, affiliation information closest to the personal information including the specified age, gender, and individual name, the hobby preference estimated from the purchase history, the affiliation information, and so forth.

The association unit 204 associates the customer traffic flow information with the attribute information extracted by the corresponding attribute extraction unit 203 (step S10).

The processing flow of the traffic flow determination system 1 according to the second exemplary embodiment of the present invention has been described above. The traffic flow determination system 1 according to the above-described second exemplary embodiment of the present invention includes the image acquisition system 10, the traffic flow information generating device 20, the traffic flow determination device 30, and the internal attribute acquisition system 40. The internal attribute acquisition system 40 manages attribute information. The internal attribute acquisition system 40 is a system provided by its own company. The traffic flow information generating device 20 includes a traffic flow information generating unit 201, a storage unit 202, an attribute extraction unit 203, and an association unit 204. The attribute extraction unit 203 acquires an image corresponding to the customer traffic flow information determined by the traffic flow information classification unit 303. Based on the acquired image corresponding to the customer traffic flow information, the attribute extraction unit 203 extracts the attribute information closest to the customer from among the attribute information managed by the internal attribute acquisition system 40. The association unit 204 associates the customer traffic flow information with the attribute information extracted by the corresponding attribute extraction unit 203.

In this way, the traffic flow determination system 1 can associate attribute information with traffic flow information of the customer in the area. As a result, the traffic flow determination system 1 can analyze the traffic flow of the customer in the area with a high accuracy without forcing the customer to perform a special act, and can provide a more suitable service for the customer.

Third Exemplary Embodiment

The configuration of the traffic flow determination system 1 according to a third exemplary embodiment of the present invention will be described.

Figure 9:
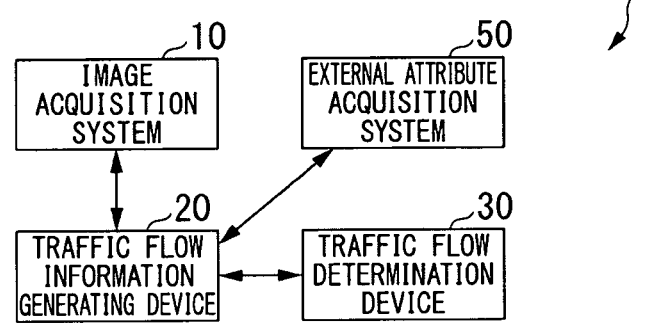
FIG. 9 is a diagram showing a configuration of a traffic flow determination system according to a third exemplary embodiment of the present invention.

As shown in FIG. 9, the traffic flow determination system 1 according to the third exemplary embodiment of the present invention includes an image acquisition system 10, a traffic flow information generating device 20, a traffic flow determination device 30, and an external attribute acquisition system 50.

The external attribute acquisition system 50 manages attribute information. The attribute information is information stored in association with each customer. The attribute information may be, for example, information indicating the age and gender estimated from the image including the face using an age and gender estimation program. The attribute information may be personal information including an individual name obtained from registration information at the time of registration of face images, point cards, and the like. The attribute information may be information indicating a hobby preference estimated from purchase history. The attribute information may be information indicating affiliation information or the like obtained from object recognition of uniforms or belongings, or the like.

The external attribute acquisition system 50 is a system provided in an external company.

Figure 10:
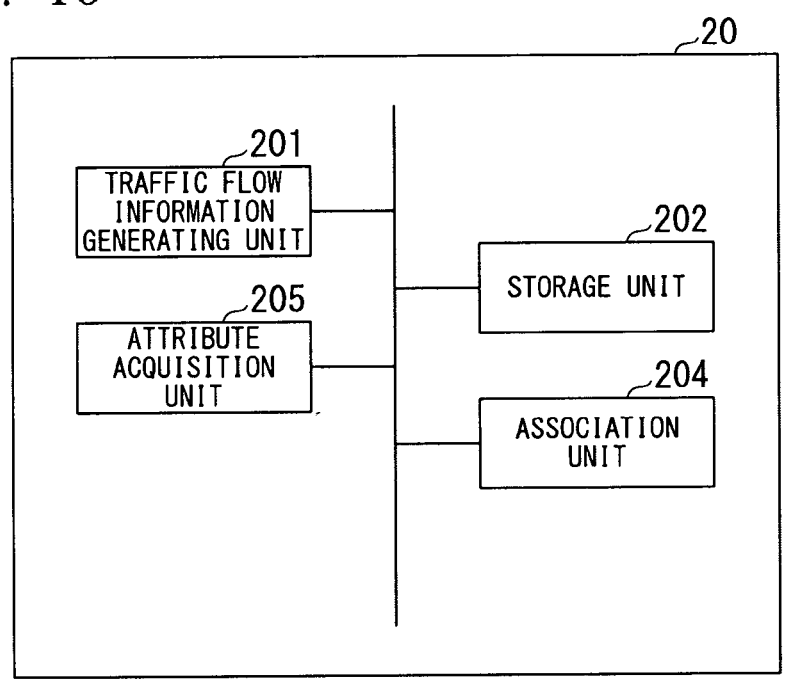
FIG. 10 is a diagram showing a configuration of a traffic flow information generating device according to the third exemplary embodiment of the present invention.

As shown in FIG. 10, the traffic flow information generating device 20 includes a traffic flow information generating unit 201, a storage unit 202, an association unit 204, and an attribute acquisition unit 205.

The attribute acquisition unit 205 acquires an image corresponding to the customer traffic flow information determined by the traffic flow information classification unit 303.

Based on the acquired image corresponding to the customer traffic flow information, the attribute acquisition unit 205 extracts the attribute information closest to the customer from among the attribute information managed by the external attribute acquisition system 50 (attribute information having the greatest relevance to the customer).

For example, when a customer has registered the image of their face in the past, the attribute acquisition unit 205 uses the face included in the image corresponding to the customer traffic flow information, to identify the face of the customer from among the attribute information managed by the external attribute acquisition system 50. The attribute acquisition unit 205 extracts attribute information associated with the identified face of the customer.

For example, in the case where the customer has not registered the image of their face, the following process may be performed. That is, the attribute acquisition unit 205 uses a program for estimating age and gender to identify the age and gender of the customer. Further, the attribute acquisition unit 205 identifies information indicating personal information including personal names obtained from registration information at the time of registration of face images, point cards, and the like, hobby preferences estimated from purchase history, and affiliation information and the like obtained from object recognition of uniforms or belongings, or the like. Then, the attribute acquisition unit 205 extracts from among the attribute information managed by the external attribute acquisition system 50, affiliation information closest to the personal information including the specified age, gender, and individual name, hobby preference estimated from the purchase history, the affiliation information, and so forth.

The association unit 204 associates the customer traffic flow information with the attribute information extracted by the corresponding attribute acquisition unit 205.

Next, the processing of the traffic flow determination system 1 according to the third exemplary embodiment of the present invention will be described.

Figure 11:
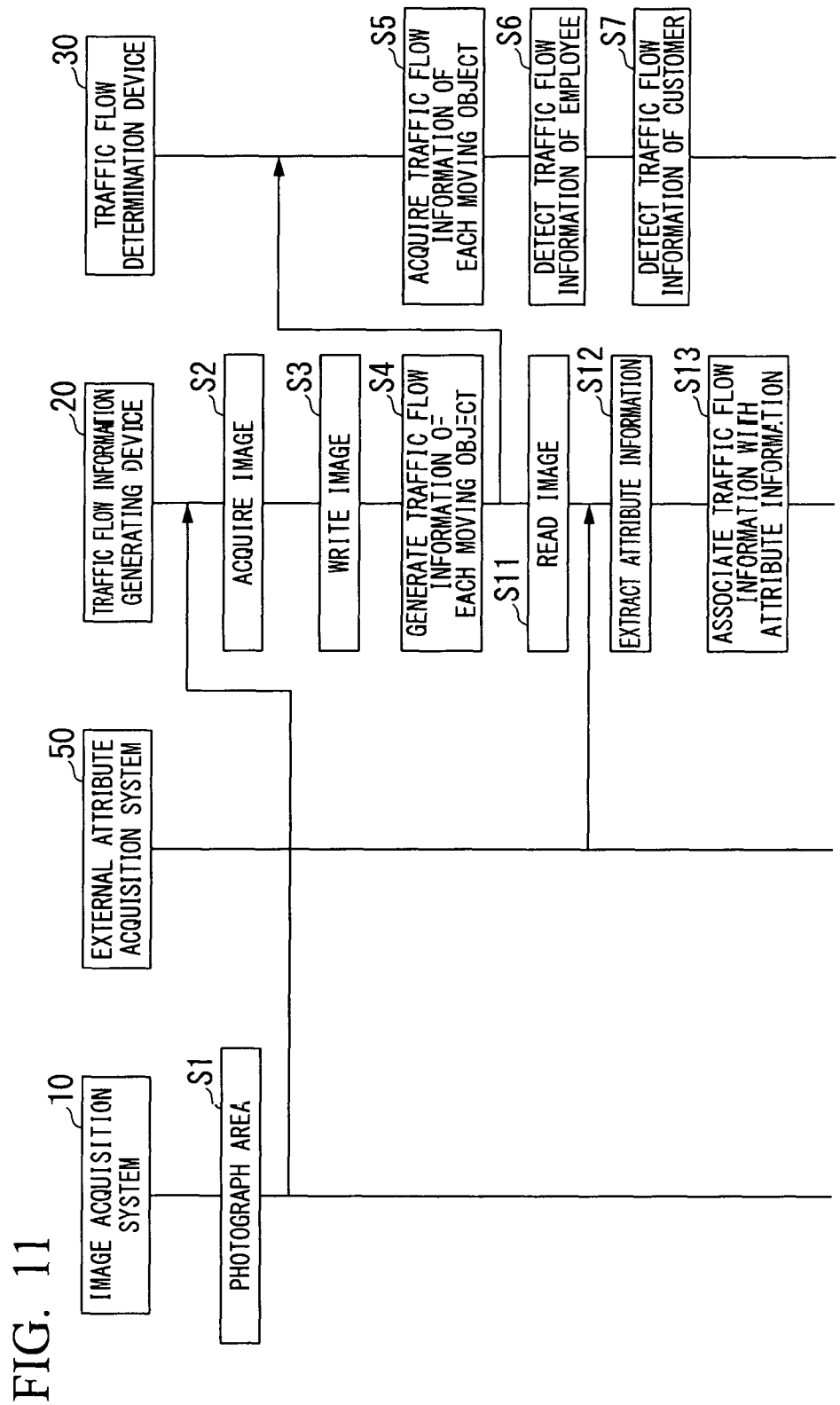
FIG. 11 is a diagram showing a processing flow of a traffic flow determination system according to the third exemplary embodiment of the present invention.

Here, the processing flow of the traffic flow determination system 1 according to the third exemplary embodiment of the present invention shown in FIG. 11 will be described.

The traffic flow determination system 1 performs the processing of step S1 to step S7.

The attribute acquisition unit 205 reads the image corresponding to the customer traffic flow information determined by the traffic flow information classification unit 303, from the storage unit 202 (step S11).

Based on the acquired image corresponding to the customer traffic flow information, the attribute acquisition unit 205 extracts the attribute information closest to the customer from among the attribute information managed by the external attribute acquisition system 50 (step S12).

For example, when a customer has registered the image of their face in the past, the attribute acquisition unit 205 uses the face in the image corresponding to the customer traffic flow information, to identify the face of the customer from among the attribute information managed by the external attribute acquisition system 50. The attribute extraction unit 205 extracts attribute information associated with the identified face of the customer.

Moreover, for example, in the case where the customer has not registered the image of their face, the attribute acquisition unit 205 uses a program for estimating age and gender to identify the age and gender of the customer. Further, the attribute acquisition unit 205 identifies information indicating personal information including personal names obtained from registration information at the time of registration of face images, point cards, and the like, hobby preferences estimated from purchase history, and affiliation information and the like obtained from object recognition of uniforms or belongings, or the like. Then, the attribute acquisition unit 205 may extract from among the attribute information managed by the external attribute acquisition system 50, affiliation information closest to the personal information including the specified age, gender, and individual name, the hobby preference estimated from the purchase history, the affiliation information, and so forth.

The association unit 204 associates the customer traffic flow information with the attribute information extracted by the corresponding attribute acquisition unit 205 (step S13).

The processing flow of the traffic flow determination system 1 according to the third exemplary embodiment of the present invention has been described above. The traffic flow determination system 1 according to the above-described third exemplary embodiment of the present invention includes the image acquisition system 10, the traffic flow information generating device 20, the traffic flow determination device 30, and the external attribute acquisition system 50. The external attribute acquisition system 50 manages attribute information. The external attribute acquisition system 50 is a system provided in an external company. The traffic flow information generating device 20 includes a traffic flow information generating unit 201, a storage unit 202, an association unit 204, and an attribute acquisition unit 205. The attribute acquisition unit 205 acquires an image corresponding to the customer traffic flow information determined by the traffic flow information classification unit 303. Based on the acquired image corresponding to the customer traffic flow information, the attribute acquisition unit 205 extracts the attribute information closest to the customer from among the attribute information managed by the external attribute acquisition system 50. The association unit 204 associates the customer traffic flow information with the attribute information extracted by the corresponding attribute acquisition unit 205.

In this way, the traffic flow determination system 1 can associate attribute information with traffic flow information of the customer in the area. As a result, the traffic flow determination system 1 can analyze the traffic flow of the customer in the area with high accuracy without forcing the customer to perform a special act, and can provide a more suitable service for the customer.

Fourth Exemplary Embodiment

The configuration of the traffic flow determination system according to a fourth exemplary embodiment of the present invention will be described.

Figure 12:
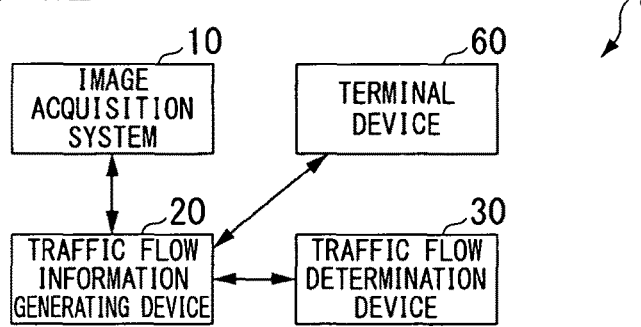
FIG. 12 is a diagram showing a configuration of a traffic flow determination system according to a fourth exemplary embodiment of the present invention.

As shown in FIG. 12, the traffic flow determination system 1 according to the fourth exemplary embodiment of the present invention includes an image acquisition system 10, a traffic flow information generating device 20, a traffic flow determination device 30, and a terminal device 60.

Figure 13:
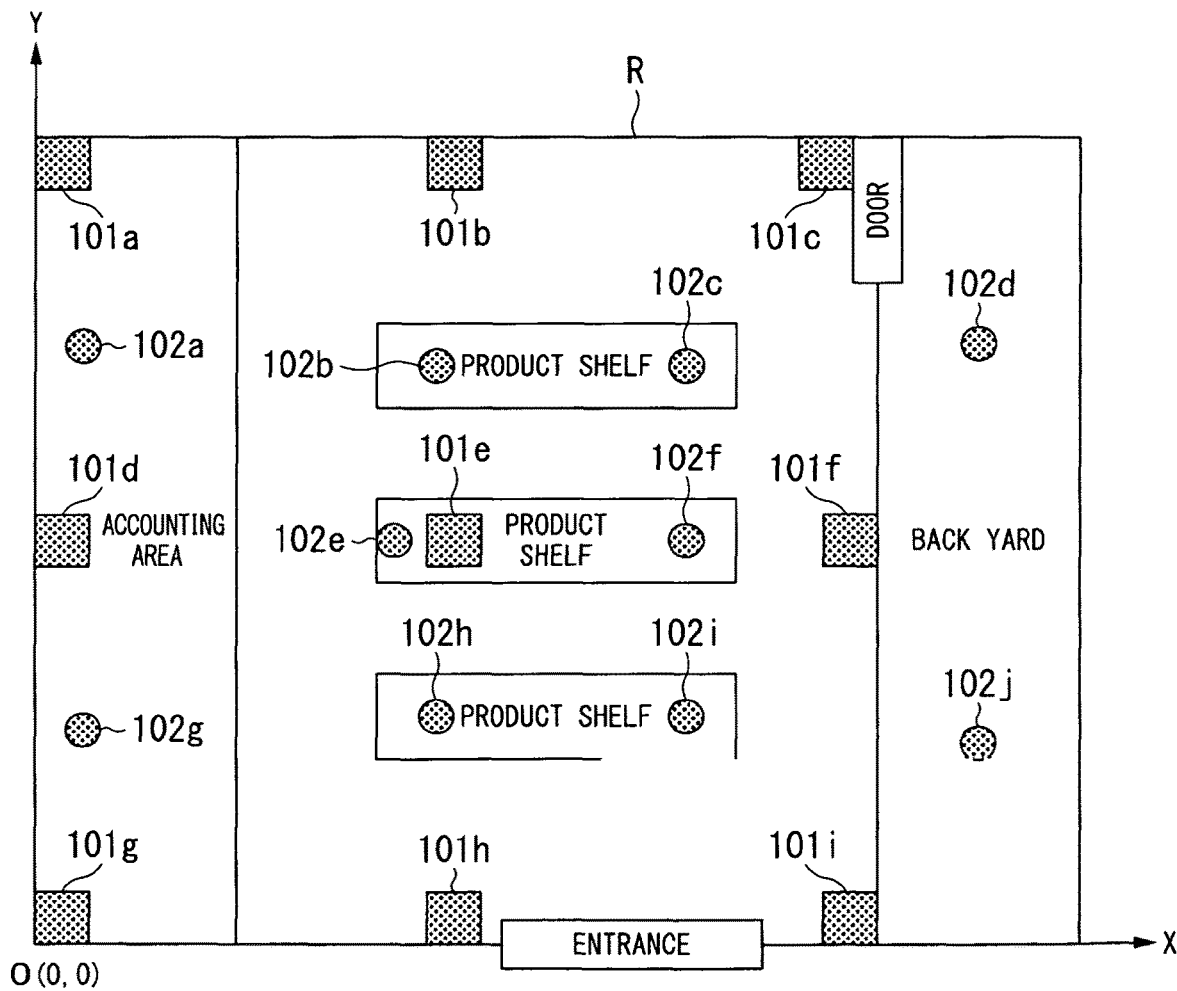
FIG. 13 is a diagram showing a configuration of an image acquisition system according to the fourth exemplary embodiment of the present invention.

As shown in FIG. 13, the image acquisition system 10 includes short-range communication units 102a, 102b, 102c, 102d, 102e, 102f, 102g, 102h, 102i, and 102j.

The short-range communication units 102a to 102j are collectively referred to as short-range communication units 102.

Each of the short-range communication units 102 is located at a high place where only an employee passes through such as an accounting area in a space R of a supermarket or a convenience store, or the like, a backyard, or a product shelf, or where there is a high possibility that an employee may stay for a long time as compared to a customer.

Each of the short-range communication units 102 performs short-range communication with the terminal device 60 to be described later. The short-range communication is communication performed using, for example, WiFi (registered trademark), BLE (Bluetooth Low Energy) (Bluetooth is a registered trademark), or the like. Each of the short-range communication units 102 records the time when short-range communication with the terminal device 60 was performed.

The short-range communication units 102 communicate with the terminal device 60 provided (carried) by each of the employees. The terminal device 60 is, for example, a smartphone.

Next, the processing of the traffic flow determination system 1 according to the fourth exemplary embodiment of the present invention will be described.

Figure 14:
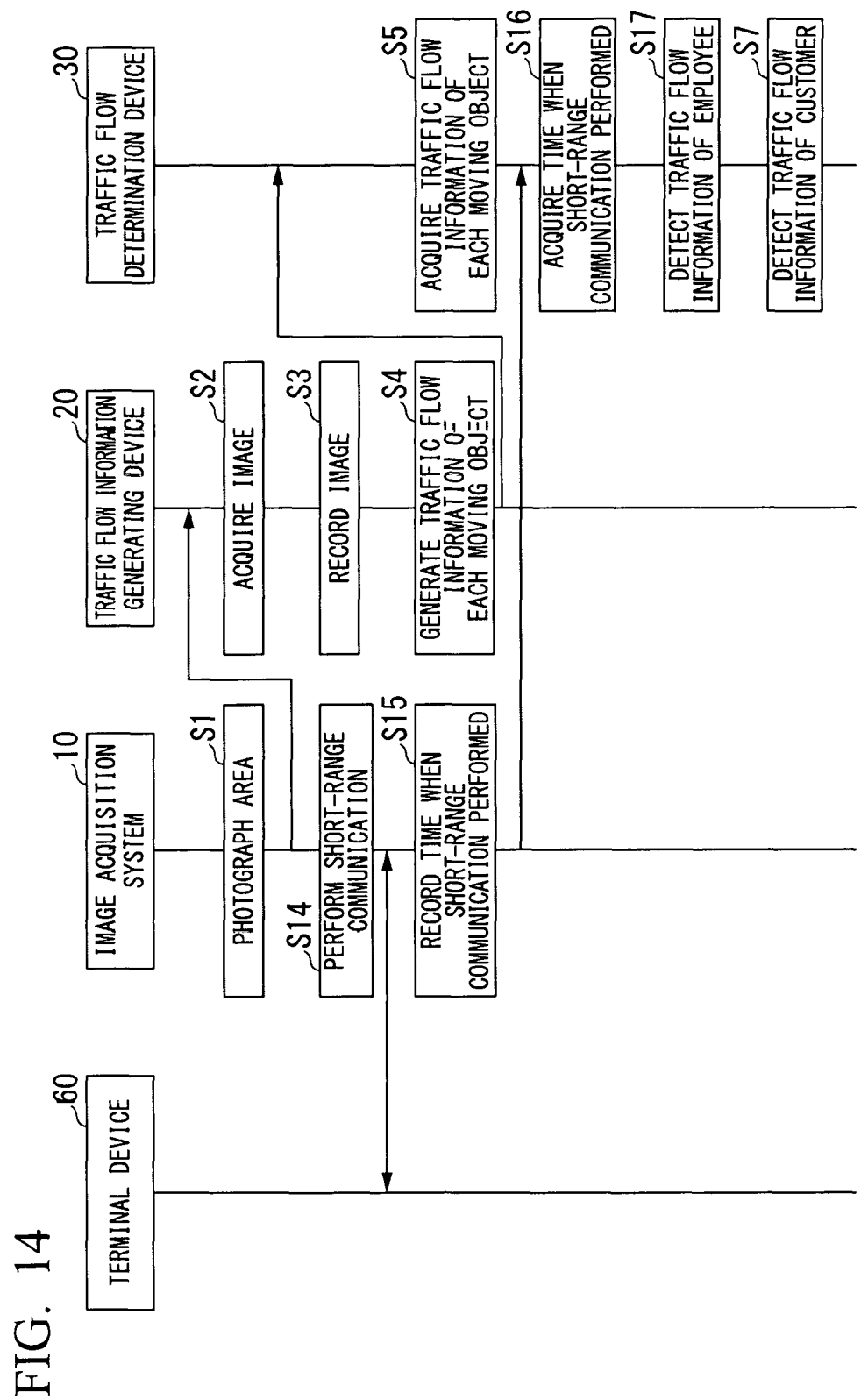
FIG. 14 is a diagram showing a processing flow of the traffic flow determination system according to the fourth exemplary embodiment of the present invention.

Here, the processing flow of the traffic flow determination system 1 according to the fourth exemplary embodiment of the present invention shown in FIG. 14 will be described.

It is assumed that the traffic flow determination system 1 has the configuration shown in FIG. 12. It is assumed that the image acquisition system 10 has the configuration shown in FIG. 13. It is assumed that the traffic flow information generating device 20 has the configuration shown in FIG. 3. It is assumed that the traffic flow determination device 30 has the configuration shown in FIG. 4.

The traffic flow determination system 1 performs the process of step S1.

Moreover, in parallel with the process of step S1 of the traffic flow determination system 1, each of the short-range communication units 102 performs short-range communication with the terminal device 60 (step S14).

Each of the short-range communication units 102 records the time when short-range communication with the terminal device 60 was performed (step S15).

The traffic flow determination system 1 performs the processing of step S2 to step S5.

The traffic flow information acquisition unit 301 transmits acquired traffic flow information of each of the moving objects, to the first moving object detecting unit 302 and the traffic flow information classification unit 303.

The first moving object detecting unit 302 and the traffic flow information classification unit 303 receive traffic flow information of each moving object from the traffic flow information acquisition unit 301.

The first moving object detecting unit 302 acquires the time when the short-range communication unit 102 has performed close range communication with the terminal device 60 from the image acquisition system 10, and the position information of the short-range communication unit 102 (step S16).

The first moving object detecting unit 302 detects traffic flow information of an employee (first moving object) belonging to the first category (step S17).

Specifically, the first moving object detecting unit 302 identifies the correspondence relationship between the position of the employee and the time from the time when the short-range communication unit 102 has performed short-range communication with the terminal device 60, and the position information of the short-range communication unit 102. Here the correspondence relationship between the position and the time includes the time when a predetermined position was passed, and the staying time stayed at a predetermined position. In addition, the first moving object detecting unit 302 identifies the correspondence relationship between the position and the time with respect to each of the plurality of pieces of traffic flow information received from the traffic flow information acquisition unit 301. The first moving object detecting unit 302 compares the correspondence relationship between the position and the time for each of the plurality of pieces of traffic flow information received from the traffic flow information acquisition unit 301, and the correspondence relationship between the position of the employee and the time. The first moving object detecting unit 302 identifies traffic flow information received from the traffic flow information acquisition unit 301 including a correspondence relationship that matches the correspondence relationship between the position of the employee and the time within a range of the determination error, as the traffic flow information of the employee.

For example, the first moving object detecting unit 302 identifies the traffic flow information indicating staying at the same product shelf for a predetermined time or more, as the traffic flow information of an employee. The reason for this is based on a determination that a person staying at the same product shelf for a predetermined period of time or more has a high possibility of performing a task for displaying a product. Therefore, the first moving object detecting unit 302 may determine that among a plurality of traffic flows, (being traffic flow where at least a part is included in a predetermined area (the predetermined position)) traffic flow showing that the staying time in the predetermined area is longer than a predetermined time (for example, one minute) or more is a traffic flow of an employee. The first moving object detecting unit 302 may determine a position where an employee has stayed for a predetermined time or more based on a correspondence relationship between the position of the employee and the time, and set the determined position as the predetermined area.

The first moving object detecting unit 302 transmits the determined traffic flow information of the employee to the traffic flow information classification unit 303.

The traffic flow information classification unit 303 receives traffic flow information of employees from the first moving object detecting unit 302.

The traffic flow determination system 1 performs the process of step S7.

As means for identifying the correspondence relationship between the position of the employee and the time, instead of the short-range communication units 102, a device for identifying the position and time using GPS (Global Positioning System), UWB (Ultra Wide Band), sound waves, IMES (indoor MEssaging System), PDR (Pedestrian Dead Reckoning) or the like may be used.

The processing flow of the traffic flow determination system 1 according to the fourth exemplary embodiment of the present invention has been described above. The traffic flow determination system 1 according to the above-described fourth exemplary embodiment of the present invention includes the image acquisition system 10, the traffic flow information generating device 20, the traffic flow determination device 30, and the terminal device 60. The image acquisition system 10 includes short-range communication units 102a to 102j. Each of the short-range communication units 102 is located at a high place where only an employee passes through such as an accounting area in a space R of a supermarket or a convenience store, or the like, a backyard, or a product shelf, or where there is a high the possibility that an employee may stay for a long time as compared to a customer. Each of the short-range communication units 102 performs short-range communication with the terminal device 60. Each of the short-range communication units 102 records the time when short-range communication with the terminal device 60 was performed. The first moving object detecting unit 302 acquires the time when the short-range communication unit 102 has performed close range communication with the terminal device 60 from the image acquisition system 10, and the position information of the short-range communication unit 102. The first moving object detecting unit 302 detects traffic flow information of an employee (first moving object) belonging to the first category. Specifically, the first moving object detecting unit 302 identifies the correspondence relationship between the position of the employee and the time, from the time when the short-range communication unit 102 has performed short-range communication with the terminal device 60, and the position information of the short-range communication unit 102. In addition, the first moving object detecting unit 302 identifies the correspondence relationship between the position and the time with respect to each of the plurality of pieces of traffic flow information received from the traffic flow information acquisition unit 301. The first moving object detecting unit 302 compares the correspondence relationship between the position and the time for each of the plurality of pieces of traffic flow information received from the traffic flow information acquisition unit 301, and the correspondence relationship between the position of the employee and the time. The first moving object detecting unit 302 identifies traffic flow information received from the traffic flow information acquisition unit 301 including a correspondence relationship that matches the correspondence relationship between the position of the employee and the time within a range of the determination error, as the traffic flow information of the employee.

In this way, the traffic flow determination system 1 can better distinguish the traffic flow information of the customer in the area from the traffic flow information of the employee, based on the correspondence relationship between the position of the employee and the time, and only traffic flow information of the customer can be identified. As a result, the traffic flow determination system 1 can analyze the traffic flow of the customer in the area with a higher accuracy without forcing the customer to perform a special act.

Fifth Exemplary Embodiment

The configuration of the traffic flow determination system 1 according to a fifth exemplary embodiment of the present invention will be described.

As with the traffic flow determination system 1 according to the first exemplary embodiment of the present invention, the traffic flow determination system 1 according to the fifth exemplary embodiment of the present invention includes an image acquisition system 10, a traffic flow information generating device 20, and a traffic flow determination device 30.

Figure 15:
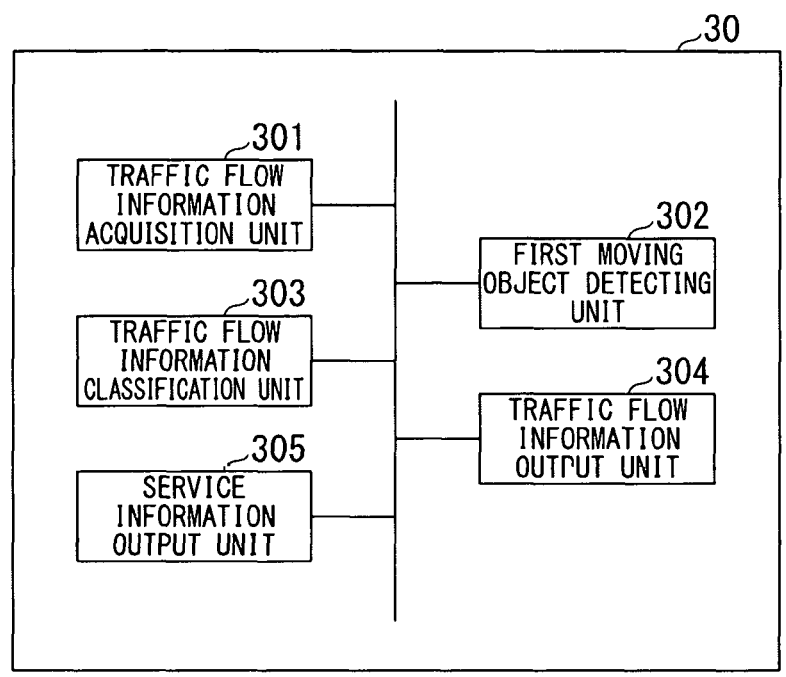
FIG. 15 is a diagram showing a configuration of a traffic flow determination device according to a fifth exemplary embodiment of the present invention.

As shown in FIG. 15, the traffic flow determination device 30 includes a traffic flow information acquisition unit 301, a first moving object detecting unit 302, a traffic flow information classification unit 303, a traffic flow information output unit 304, and a service information output unit 305.

The traffic flow information output unit 304 outputs traffic flow information determined to correspond to a predetermined traffic flow, among the customer traffic flow information.

The service information output unit 305 outputs service information for a customer who has moved on a trajectory of the traffic flow information output from the traffic flow information output unit 304. The service information is, for example, information on bargain date/day and information on discount coupons related to products on that trajectory.

Next, the processing of the traffic flow determination system 1 according to the fifth exemplary embodiment of the present invention will be described.

Figure 16:
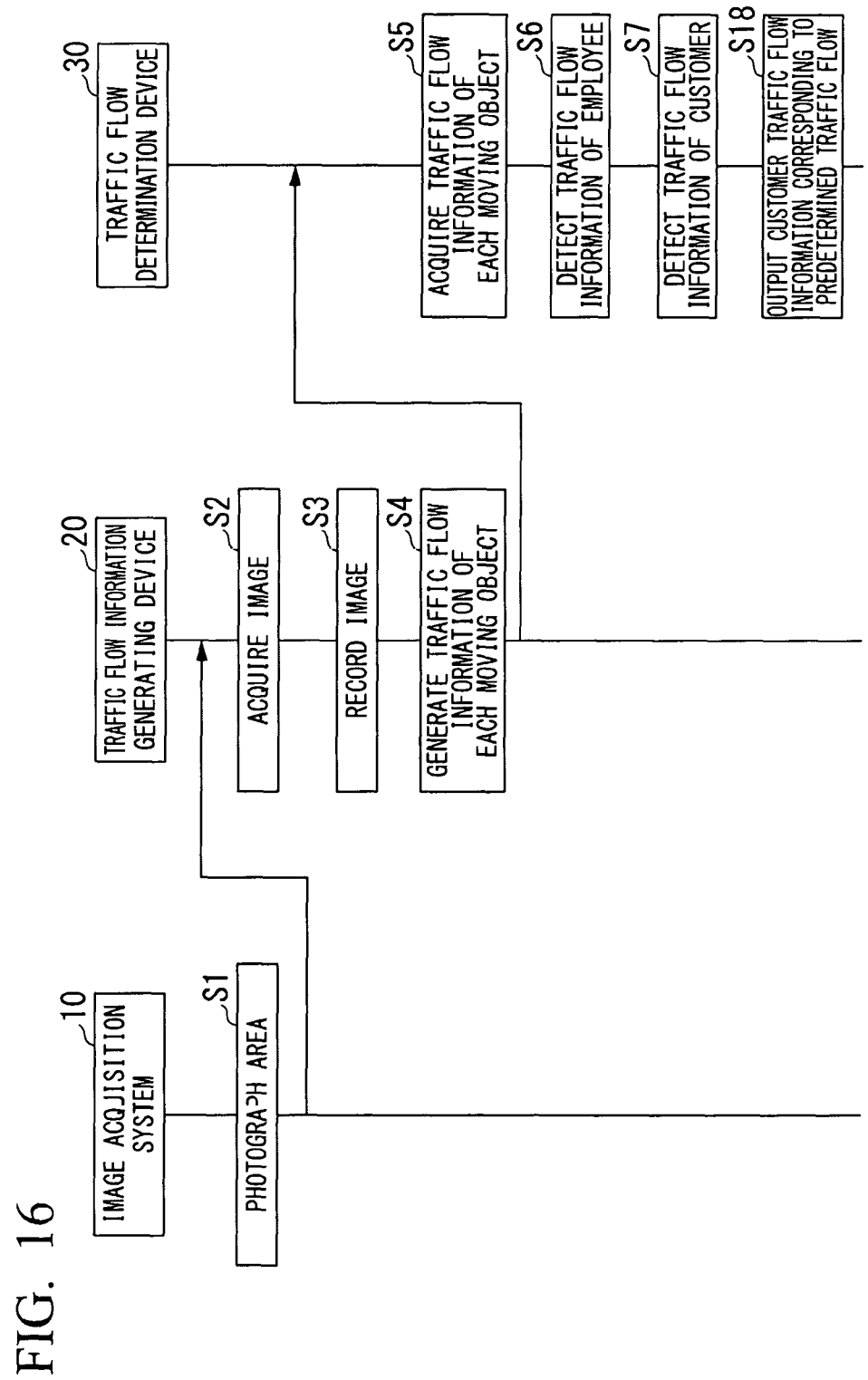
FIG. 16 is a diagram showing a processing flow of a traffic flow determination system according to the fifth exemplary embodiment of the present invention.

Here, the processing flow of the traffic flow determination system 1 according to the fifth exemplary embodiment of the present invention shown in FIG. 16 will be described.

It is assumed that the traffic flow determination system 1 has the configuration shown in FIG. 1. It is assumed that the image acquisition system 10 has the configuration shown in FIG. 12. It is assumed that the traffic flow information generating device 20 has the configuration shown in FIG. 3. It is assumed that the traffic flow determination device 30 has the configuration shown in FIG. 15.

The traffic flow determination system 1 performs the processing of step S1 to step S7.

The traffic flow information output unit 304 outputs traffic flow information determined to correspond to a predetermined traffic flow among the traffic flow information of customers (step S18).

For example, the traffic flow information output unit 304 reads from the storage unit, predetermined traffic flow information indicating a predetermined traffic flow that has been previously determined. The traffic flow information output unit 304 compares the read predetermined traffic flow information with each of the pieces of customer traffic flow information. When it is determined that the read predetermined traffic flow information among the customer traffic flow information agrees within the range of the determination error, the traffic flow information output unit 304 determines that the traffic flow information of that customer corresponds to the predetermined traffic flow. Then, the traffic flow information output unit 304 outputs traffic flow information to a monitor or the like. At this time, the traffic flow information output unit 304 may display an image of the customer together with the traffic flow information, simultaneously on the monitor.

The service information output unit 305 outputs service information for a customer who has moved on a trajectory of the traffic flow information output from the traffic flow information output unit 304. The service information is, for example, information on bargain date/day and information on discount coupons related to products on that trajectory.

Note that the service information may be provided by an employee looking at a customer displayed on a monitor or the like, by hand delivery, by mailing, or the like.

The processing flow of the traffic flow determination system 1 according to the fifth exemplary embodiment of the present invention has been described above. The traffic flow determination system 1 according to the above-described fifth exemplary embodiment of the present invention includes the image acquisition system 10, the traffic flow information generating device 20, and the traffic flow determination device 30. The traffic flow determination device 30 includes the traffic flow information acquisition unit 301, the first moving object detecting unit 302, the traffic flow information classification unit 303, the traffic flow information output unit 304, and the service information output unit 305. The traffic flow information output unit 304 outputs traffic flow information determined to correspond to a predetermined traffic flow, among the customer traffic flow information. The service information output unit 305 outputs service information for a customer who has moved on a trajectory of the traffic flow information output from the traffic flow information output unit 304.

In this way, the traffic flow determination system 1 can provide service information according to the taste of the customer.

The configuration of the traffic flow determination device 30 according to an exemplary embodiment of the present invention will be described.

Figure 17:
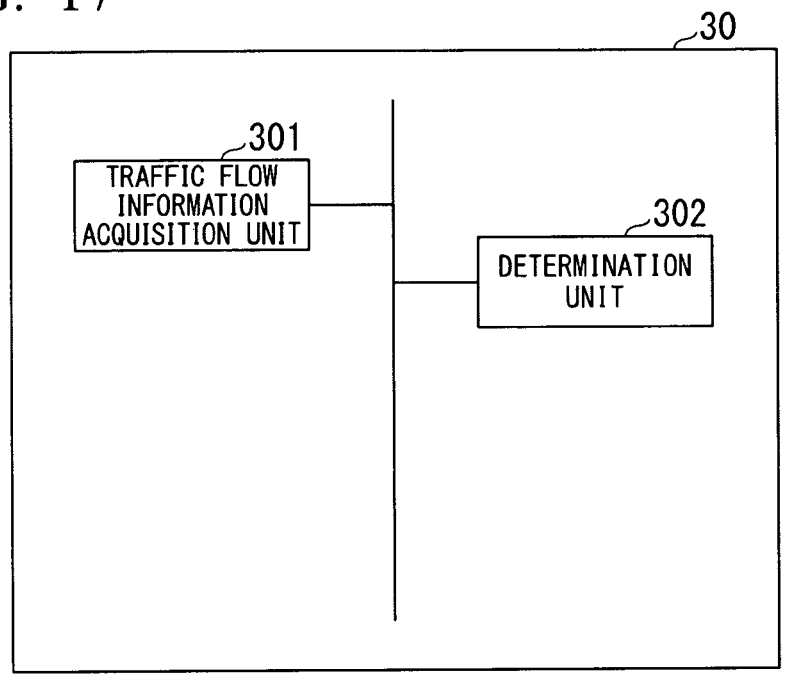
FIG. 17 is a diagram showing a configuration of a traffic flow determination device according to an exemplary embodiment of the present invention.

As shown in FIG. 17, the traffic flow determination device 30 includes a traffic flow information acquisition unit 301, and a determination unit 302.

The traffic flow information acquisition unit 301 acquires the traffic flow of an object.

The determination unit 302 determines that among the traffic flows of the object, a traffic flow in which at least a part of the traffic flow is included in a predetermined area is a traffic flow of a person belonging to a first category.

In this way, the traffic flow determination device 30 can determine traffic flow information of a person (for example, an employee) belonging to the first category, and can distinguished traffic flow information of a person belonging to the first category from customer traffic flow information. As a result, the traffic flow determination device 30 can analyze the traffic flow of the customer in the area with a higher accuracy without forcing the customer to perform a special act.

The configuration of the traffic flow determination system 1 according to an exemplary embodiment of the present invention will be described.

Figure 18:
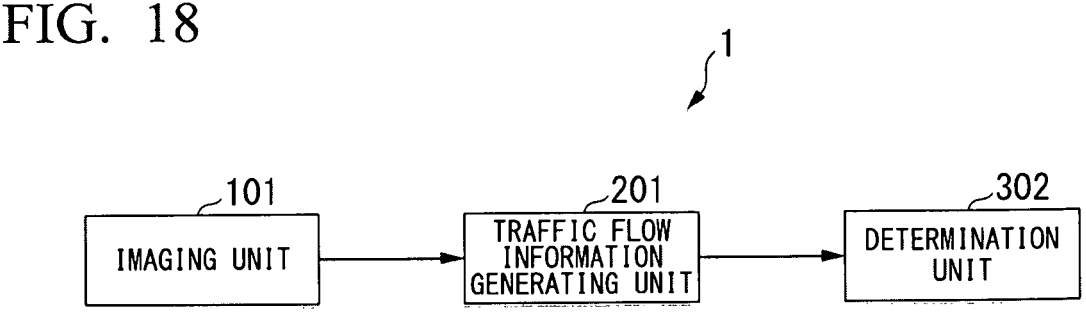
FIG. 18 is a diagram showing a configuration of a traffic flow determination system according to an exemplary embodiment of the present invention.

As shown in FIG. 18, the traffic flow determination system 1 includes an imaging unit 101, a traffic flow generating unit 201, and a determination unit 302.

The imaging unit 101 photographs and acquires an image.

The traffic flow generating unit 201 generates a traffic flow of an object included in the image acquired by the imaging unit 101.

The determination unit 302 determines that among the traffic flows of the object acquired from the traffic flow generating unit 201, a traffic flow in which at least a part of the traffic flow is included in a predetermined area is a traffic flow of a person belonging to a first category.

In this way, the traffic flow determination system 1 can determine traffic flow information of a person (for example, an employee) belonging to the first category, and can distinguished traffic flow information of a person belonging to the first category from customer traffic flow information. As a result, the traffic flow determination device 30 can analyze the traffic flow of the customer in the area with a higher accuracy without forcing the customer to perform a special act.

The traffic flow determination device 30 according to the exemplary embodiment of the present invention may include a part or all of the functional parts of the traffic flow information generating device 20.

In the processing flow according to the exemplary embodiment of the present invention, the order of processing may be changed within a range in which appropriate processing is performed.

Each of the storage unit 202 according to the exemplary embodiment of the present invention and the other storage units may be provided anywhere within a range in which appropriate information transmission and reception is performed. Also, each of the storage unit 202 and the other storage units may store in a dispersed manner, a plurality of existing data within a range in which appropriate information transmission and reception is performed.

Exemplary embodiments of the present invention have been described. Each of the image acquisition system 10, the traffic flow information generating device 20, the traffic flow determination device 30, the internal attribute acquisition system 40, the external attribute acquisition system 50, and the terminal device 60 described above may have a computer system therein. Further, the process described above is stored in a computer-readable recording medium in the form of a program, and the above process is performed by the computer reading and executing the program. Here, the computer-readable recording medium means a magnetic disk, a magneto-optical disk, a CD-ROM, a DVD-ROM, a semiconductor memory, or the like. Alternatively, the computer program may be distributed to a computer via a communication line, and the computer receiving the distribution may execute the program.

Further, the above program may realize part of the above-described functions. Furthermore, the above-described program may be a so-called difference file (differential program) being a file which can realize the above-described functions by a combination with a program already recorded in the computer system.

Several exemplary embodiments of the present invention have been described above. However these exemplary embodiments are examples and do not limit the scope of the invention. In these exemplary embodiments, additions, various omissions, substitutions, and changes may be made within a scope that does not depart from the spirit of the invention.

INDUSTRIAL APPLICABILITY

The present invention may be applied to a traffic flow determination device, a traffic flow determination system, a traffic flow determination method, and a program.

REFERENCE SYMBOLS

1 Traffic flow determination system
10 Image acquisition system
20 Traffic flow information generating device
30 Traffic flow determination device
40 Internal attribute acquisition system
50 External attribute acquisition system
60 Terminal device
101, 101a to 101i Image acquisition units
102, 102a to 102j Short-range communication units
201 Traffic flow information generating unit
202 Storage unit
203 Attribute extraction unit
204 Association unit 205 Attribute acquisition unit
301 Traffic flow information acquisition unit
302 First moving object detecting unit, determination unit
303 Traffic flow information classification unit
304 Traffic flow information output unit
305 Service information output unit

The invention claimed is:

1. A traffic flow determination system comprising:
a short-range communication device that is located at a location through which only an employee of a retail business passes, and is configured to perform short-range communication with a terminal device, wherein the location is associated with the retail business;
at least one memory configured to store instructions; and
at least one processor configured to execute the instructions to:
obtain a plurality of images from a camera, wherein said plurality of images include a plurality of moving objects;
acquire, from the plurality of images, a plurality of traffic flows, wherein each traffic flow corresponds to the movement of one of said plurality of moving objects;
identify, from the plurality of traffic flows, a traffic flow of the employee of the retail business based on a correspondence relationship between: a time when the short-range communication device has performed the short-range communication with the terminal device; and the location at which the short-range communication device is located;
determine that, among the plurality of traffic flows, a traffic flow other than the identified traffic flow is a traffic flow of a customer;
determine whether the traffic flow of the customer corresponds to a predetermined traffic flow; and
output service information for the customer when it is determined that customer traffic flow information corresponds to predetermined traffic information read from a storage, wherein the service information comprises information related to products on the traffic flow of the customer.

2. The traffic flow determination system of claim 1, wherein the plurality of images include a first image, the first image includes a first person, and the first person is moving.

3. The traffic flow determination system of claim 2, wherein the at least one processor acquires the plurality of traffic flows by detecting moving objects in the plurality of images.

4. The traffic flow determination system of claim 3, wherein each traffic flow of the plurality of traffic flows corresponds to a movement of one or more persons through a facility.

5. The traffic flow determination system of claim 4, wherein a first traffic flow of the plurality of traffic flows is composed of pieces of traffic flow information corresponding to the first person.

6. The traffic flow determination system of claim 5, wherein the at least one processor identifies, from the plurality of traffic flows, the first traffic flow that passes through a position of the facility which is in an employee-only area.

7. The traffic flow determination system according to claim 1, wherein identifying the traffic flow comprises identifying, from the plurality of traffic flows, a traffic flow that passes through a plurality of locations through which only the employee passes.

8. The traffic flow determination system according to claim 1, wherein the at least one processor identifies age and gender of the customer.

9. The traffic flow determination system according to claim 1, further comprising:
the camera configured to capture the plurality of images.

10. The traffic flow determination system according to claim 9,
wherein the employee is a first employee, the camera is a first camera, the traffic flow is a first traffic flow and the system further comprises a plurality of short range communication devices comprising a first short range communication device that is the short range communication device, a plurality of cameras comprising the first camera and a second camera are provided in a space of the retail business, a plurality of employees comprises the first employee, each of a plurality of user terminals are associated with respective ones of the plurality of employees and a first user terminal that is the terminal device is associated with the first employee,
wherein the at least one processor is further configured to identify the first traffic flow based on a first image from the first camera and based on a first time recorded in the first short range communication device when the first short range communication device is in communication with the first user terminal, and
wherein the at least one processor is further configured to identify affiliation information of the customer by processing at least a second image captured by the second camera.

11. The traffic flow determination system according to claim 1, wherein the information related to products on the traffic flow of the customer includes information on discount coupons related to the products on the traffic flow of the customer.

12. The traffic flow determination system according to claim 1, wherein the service information further includes information on a bargain date or day.

13. The traffic flow determination system according to claim 1, wherein the at least one processor determines that the traffic flow of the customer corresponds to the predetermined traffic flow when the at least one processor determines that the traffic flow of the customer matches with the predetermined traffic flow.

14. The traffic flow determination system according to claim 1,
wherein the service information for the customer is based on a customer identity, the customer identity is found based on a facial recognition, the facial recognition is based on the plurality of images, and
wherein the service information is further based on a product shelf physically near the traffic flow of the customer.

15. The traffic flow determination system according to claim 14, wherein the service information is further based on a purchase history of the customer.

16. A traffic flow determination method comprising:
performing, by a short-range communication device that is located at a location through which only an employee of a retail business passes, short-range communication with a terminal device, wherein the location is associated with the retail business;
obtaining, by at least one processor, a plurality of images from a camera, wherein said plurality of images include a plurality of moving objects;

acquiring, by the least one processor, a plurality of traffic flows, wherein each traffic flow corresponds to the movement of one of said plurality of moving objects;

identify, from the plurality of traffic flows, a traffic flow of the employee of the retail business based on a correspondence relationship between: a time when the short-range communication device has performed the short-range communication with the terminal device; and the location at which the short-range communication device is located;

determining that, among the plurality of traffic flows, a traffic flow other than the identified traffic flow is a traffic flow of a customer;

determining whether the traffic flow of the customer corresponds to a predetermined traffic flow; and outputting service information for the customer when it is determined that customer traffic flow information corresponds to predetermined traffic information read from a storage, wherein the service information comprises information related to products on the traffic flow of the customer.

17. A traffic flow determination system comprising:

a camera configured to acquire an image by performing imaging, wherein said image includes a plurality of moving objects;

a short-range communication device that is located at a location through which only an employee of a retail business passes, and is configured to perform short-range communication with a terminal device, wherein the location is associated with the retail business;

at least one memory configured to store instructions; and at least one processor configured to execute the instructions to:

generate a plurality of traffic flows based on the image, wherein each traffic flow corresponds to the movement of one of said plurality of moving objects;

identify, from the plurality of traffic flows, a traffic flow of the employee of the retail business based on a correspondence relationship between: a time when the short-range communication device has performed the short-range communication with the terminal device; and the location at which the short-range communication device is located;

determine that, among the plurality of traffic flows, a traffic flow other than the identified traffic flow is a traffic flow of a customer;

determine whether the traffic flow of the customer corresponds to a predetermined traffic flow; and output service information for the customer when it is determined that customer traffic flow information corresponds to predetermined traffic information read from a storage, wherein the service information comprises information related to products on the traffic flow of the customer.

* * * * *